United States Patent [19]

Beals

[11] Patent Number: 4,843,639

[45] Date of Patent: Jun. 27, 1989

[54] FULLY AUTOMATIC GARAGE DOOR OPENER

[76] Inventor: Richard G. Beals, 2119 Canary Dr., Ponca City, Okla. 74604

[21] Appl. No.: 169,281

[22] Filed: Mar. 17, 1988

[51] Int. Cl.[4] .............................................. H04B 9/00

[52] U.S. Cl. .............................. 455/603; 340/825.72; 318/480; 455/617

[58] Field of Search .............. 340/696, 825.72, 825.69; 318/480; 455/600, 603, 606, 607, 608, 612, 617, 618, 619

[56] References Cited

U.S. PATENT DOCUMENTS

| | | | |
|---|---|---|---|
| 2,429,607 | 10/1947 | Capen | 455/617 |
| 4,025,791 | 4/1977 | Lonnington | 250/341 |
| 4,404,558 | 9/1983 | Yen | 340/825.72 |
| 4,426,662 | 1/1984 | Skerlos et al. | 455/603 |
| 4,727,593 | 2/1988 | Goldstein | 455/603 |
| 4,731,605 | 3/1988 | Nixon | 340/825.72 |
| 4,750,118 | 6/1988 | Heitschel | 340/825.69 |

*Primary Examiner*—Robert L. Griffin
*Assistant Examiner*—Leslie V. Beek
*Attorney, Agent, or Firm*—William J. Miller

[57] ABSTRACT

This invention relates to a door or a gate for an enclosure, controlled remotely by a vehicle using an electronic control for moving the door to an open or closed position with a switch for initiating the operation of the control. The invention particularly relates to an improvement for opening and closing the door or gate and essentially includes a light transmission means mounted on the vehicle for generating a light beam, with a first light receiving apparatus mounted in the enclosure for receiving the generated light when the vehicle is clear of the door or gate. When the first light receiver detects the light beam, it either switches the control to close or open the door or gate. A second light receiving apparatus is mounted outside the enclosure in the normal path the vehicle travels while entering or leaving the enclosure. The second light receiving apparatus is mounted in a position to receive the beam of light when the vehicle passes the mounted location. When the second receiving apparatus detects the light beam, the garage door or gate is either closed or opened, depending upon its present position.

5 Claims, 1 Drawing Sheet

FULLY AUTOMATIC GARAGE DOOR OPENER

BRIEF DESCRIPTION OF THE PRIOR ART

Pat. No. 4,426,662 discloses an infrared remote controlled detector and decoder developed for the purpose of transmitting a light signal from a hand held unit to a television set for the purpose of changing channels, volume and the like on said television set.

Pat. No. 2,429,607 illustrates the use of a radio transmitter, infrared transmitter and the like for moving vehicles for the control of traffic lights. The device, however, is used principally to warn an automobile of problems on curves and the like.

BRIEF DESCRIPTION OF THE INVENTION

This invention discloses an infrared transmitter mounted on an automobile for the purpose of triggering an infrared receiver mounted inside of a garage or other enclosure and a second infrared detector mounted outside the garage along the pathway normally traveled by the vehicle. The garage includes a garage door opening device of the type which can be operated by punching a button or other trigger device and either automatically opening or closing the garage door, depending upon the position of the garage door at the time the button is pressed. As the vehicle enters the pathway normally driven by the vehicle toward the garage door to be opened, the vehicle passes an infrared sensor. The vehicle is transmitting an infrared code signal at the time the vehicle passes the infrared detector. Once the transmitted signal is detected, it communicates this signal to the control center for the automatic garage door opener which then opens the garage door. The vehicle continues to travel, once the garage door is opened, to the interior of the garage. As it reaches the interior of the garage and the vehicle has cleared the door, a second infrared detector will be triggered by the signal being transmitted by the vehicle, closing the garage door behind the vehicle. When the ignition is disconnected then the infrared transmitter is disconnected so no signal will then be continually transmitted to the interior of the garage; thus, the garage door will not reopen once it closes.

When a person enters the vehicle with the garage door down and turns on the ignition, the infrared transmitter will be turned on which will communicate a coded signal to the infrared receiver inside the garage which will, in turn, transmit a signal to the switching circuit of the garage door opener causing the garage door to open. As the vehicle backs out of the driveway, it will again pass the first infrared detector which will again generate a signal into the switching circuit of the garage door control circuit causing the garage door to close.

The transmitter will normally be on for a fixed period of time, said period is controlled by a timer. Such period is generally two hours, since the normal trips travelled by a vehicle inside a town are two hours or less. The system can, however, be reinitiated by returning to the vehicle if it has been turned off and restarting the vehicle which will again reset the timer for two hours and beginning the timing sequence again.

If upon reaching the garage, the door does not open since the timer has shut off, the timer can be restarted by pressing a manual button inside the vehicle which will cause the transmitter to operate generating an infrared signal for opening the garage door. Since the timer was restarted again it will then close the door once the vehicle has been positioned inside the garage.

DETAILED DESCRIPTION OF THE FIGURES

Figure 1:
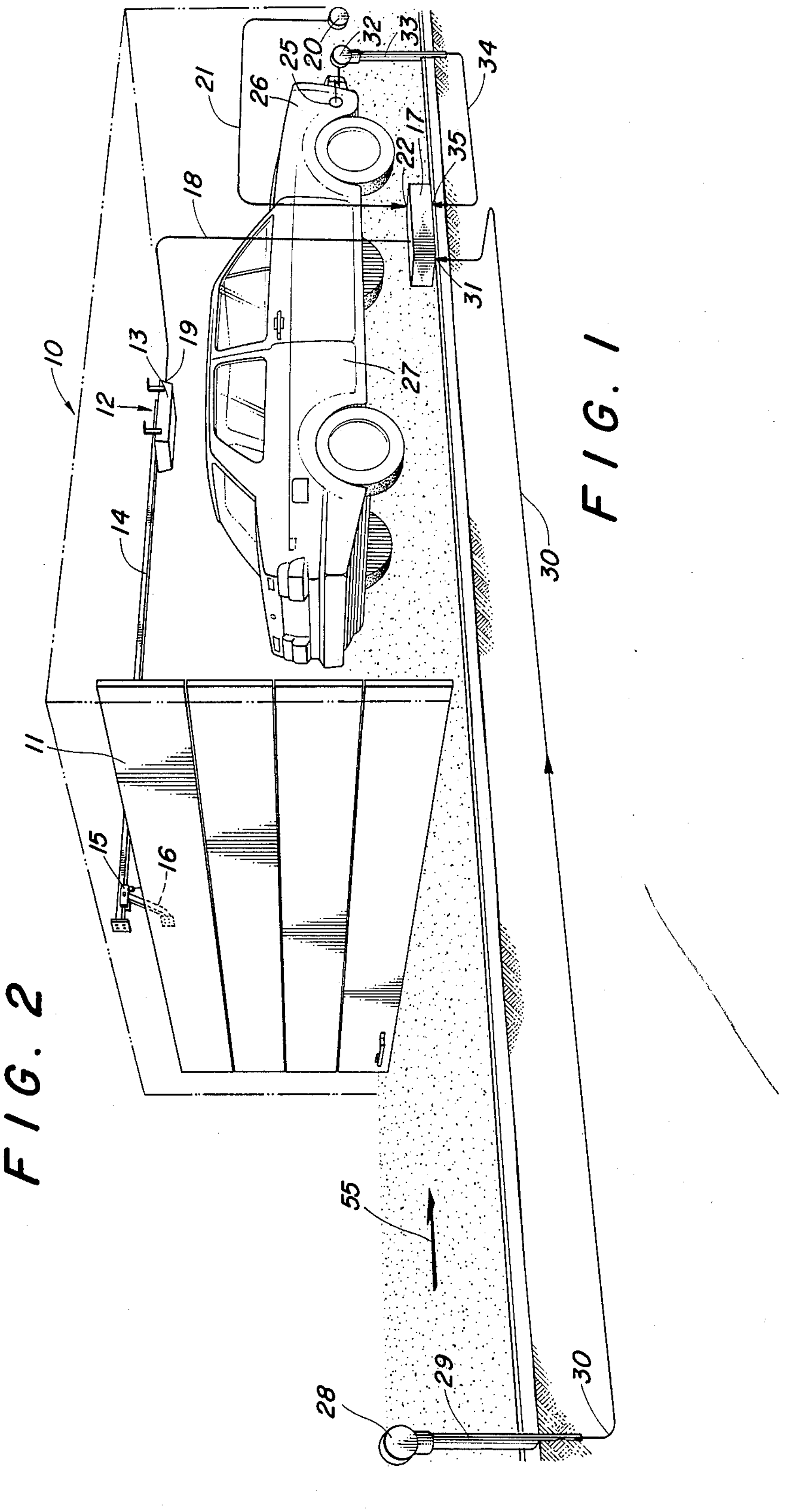
FIG. 1 illustrates an enclosure with a vehicle therein having an automatic garage door opening device attached thereto and showing the positioning of the infrared receiving elements.

Referring to all of the FIGURES, but in particular to FIG. 1, an enclosure 10 (illustrated in dotted lines) has a garage door 11 attached in front of enclosure 10 i the usual manner. Tracks (not shown) are provided to raise and lower door 11 so that door 11 can be positioned either open or closed. A normal garage door opener illustrated by arrow 12 is automatic and has a motor box 13 which is connected through a track 14 to an opening or closing lever 15 which is attached through a lever arm 16 to garage door 11. An electrical control circuit 17 is coupled through a wire 18 to an input 19 of garage door motor box 13. Control circuit 17 contains the usual circuits necessary to cause motor box 13 to turn clockwise or counterclockwise, moving lever 15 in a manner to open or close door 11. An axillary switch 20 may be coupled through a wire 21 to an input 22 of control circuit 17 for the purpose of manually opening or closing door 11 by a person inside enclosure 10.

This invention basically comprises a means for operating control circuit 17 by a system other than an electrical transmitter which is the usual means for opening or closing a garage door. Electrical transmitters have several problems. One is the possibility of other persons owning transmitters with the same frequency and control impulses causing your garage door to open or close without your actually desiring it to be opened or closed. Secondly, hand held controls lend themselves to being stolen by thieves whereupon the controls are then moved to your garage location, the garage opened and your house entered and pilfered.

This invention specifically relates to an unique infrared transmitter which is placed on the vehicle in the location of the front bumper. The unit can be extremely small and easily protected from the weather and debris normally present in that area. It is obvious that the device can be placed elsewhere on the vehicle and still be operable and still be within the scope and teachings of this invention. So that a detector such as an infrared transmitter 25 (hereafter infrared will be referred to as I-R) is mounted on a location such as a front fender 26 of a vehicle 27. I-R transmitter 25 is controlled by a circuit which will be described when reference is made to FIG. 2 However, I-R transmitter 25 does generate an infrared signal which carries an unique coded pulse train which coded pulse train is received by an outside I-R receiver 28 or an inside I-R receiver 32 which is mounted in the interior of enclosure 10. I-R receiver 28 is mounted in any usual manner such as on a post 29 which can be rigid and mounted in cement or in the surface of the earth. I- R receiver 28 has its output coupled through a wire 30 to an input 31 of control circuit 17. I-R detector 32, likewise, is shown mounted on a post 33. I-R detector 32 is coupled through a wire 34 to an inlet 35 of control circuit 17.

Figure 2:
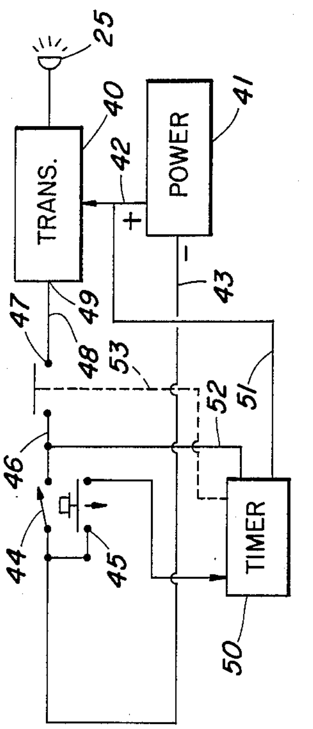
FIG. 2 the automatic timing circuit for controlling the transmitter mounted on the vehicle.

Referring to FIG. 2, an I-R transmitter 40 is coupled to I-R transmitter 25 which may be a light emitting diode. Light emitting diode transmitter 25 and its use will be later described. A power supply, such as a vehicle battery 41, has a wire 42 which may be the positive wire and is connected to a transmitter unit 40. A negative wide 43 is coupled to ignition switch 44 or a push switch 45 which is normally open. Ignition switch 44 and push switch 45 are coupled through a wire 46 to a timer relay switch 47. Timer relay switch 47 which is mechanically operated by linkage 53, is subsequently coupled through a wire 48 to provide the power at input 49 to transmitter unit 40. A timer 50 has one power lead 51 connected to the positive wire 42 and a second lead 52 coupled to the junction between ignition switch 44 or push switch 45 and timer relay contacts 47 on wire 46. Mechanical linkage 53 couples timer 50 to relay contacts 47.

OPERATION

The apparatus operates in the following manner: as vehicle 27 is entering the pathway as illustrated by arrow 55, I-R transmitter 25 passes outside I-R receiver 28. Since transmitter 25 is transmitting the coded pulse train necessary for keying the switch inside electrical control circuit 17 on a continuous basis, it is received by outside I-R detector 28 which immediately transmits the signal through wire 30 and into electrical control circuit 17. Control circuit 17 then compares the received pulse train with the preset coded pulse inside control circuit 17 and if the coded pulse train is proper, transmits a switching signal to wire 18 which turns on the motor inside motor box 13 causing lever 15 to move in a direction to open door 11. Vehicle 27 then proceeds forward in the direction of arrow 55, passing under door 11 and to stopping position opposite inside I-R receiver 32. Since transmitter 25 is still transmitting, receiver 32 will immediately communicate the signal received through wire 34 to control box 17 which again compares the coded pulse train with the preselected coded pulse inside box 17. Again, if the signal is proper, then control box 17 will apply the proper switching circuit current to wire 18 which will, through input 19, cause motor 13 to reverse, moving lever 15 in the opposite direction closing door 11. A hand switch 20 which is shown in this drawing as inside the interior of enclosure 10, can be actuated at any time to open or close garage door 11. It is obvious that an external switch (not shown) can also be provided to open or close garage door 11 if desired.

Normally, if vehicle 27 is inside the garage, when vehicle 27 is started, ignition switch 44 will be closed (see FIG. 2). This closure will apply power through wire 43, through switch 44 to timer 50 through wire 52 and wire 51. Power is also supplied through wire 42 to transmitter 40 and timer 50, having voltage which will then, through mechanical linkage 53, close normally opened relay 47 transferring the power to wire 46 and through wire 48 to input 49 of transmitter unit 40 causing the generation of a light beam at I-R transmitter 25. The light beam will then impinge upon inside I-R receiver 32 causing garage door 11 to open as previously explained.

Timer 50 is installed primarily for the purpose of cutting down on the total transmission time of I-R transmitter 40 and its associated transmitter I-R light 25. It is obvious that the timing circuit can be eliminated and the ignition switch be the sole switch for turning on or off transmitter 40. It is also obvious that if the period of time elapses and the automobile has still be in motion, then the timing sequence can be restarted by merely pushing switch 45 which will again apply power to timer 50 causing timer 50 to reinitiate its sequence of time which, as previously described, can be any period of time such as two hours and then the transmitter will function causing light 25 to emit the coded signal to open or close garage door 11 as the case may be.

CONCLUSIONS

This circuit provides several unique features. First, it is difficult to start the vehicle without the garage door or gate being open, since the unit will automatically open the garage door or gate once the ignition is turned on. This prevents the inadvertent destruction of the garage door or gate when the driver thinks or forgets to open it. Secondly, in the case of a double car garage, the control can not open the wrong door causing the vehicle to damage the garage door since the wrong door has opened.

It is also obvious that transmitter 25 can be located at any position on the vehicle. For example, it is shown on the front side location in the illustrated drawing. It can also be located at the center or the front of the vehicle. It can further be located at the rear of the vehicle and it can be located on either side or both sides of the vehicle. Further, in case of a double car garage, receivers 28 and 32 can be located on either side of the driveway or at some remote location, for example, if a long drive spans the distance between the garage door and the entry to the property, then I-R receiver 28 can be located at the entrance to the property causing the door to be completely opened before the vehicle reaches the desired location.

The basic description of this invention has been to a garage door. It is obvious that any closure apparatus, such as a gate, can also be operated in the same manner as the garage door and still be well within the teachings of this invention.

It is obvious, of course, that other modifications and changes can be made and still be well within the spirit and scope of this invention as described in the specification and appended claims.

What I claim is:

1. In an enclosure for a vehicle, said enclosure having an automatically movable closure apparatus, an electrical control for moving said closure apparatus to an open or closed position and a switch means for initiating the operation of said control, an improvement comprising:

(a) light transmission means mounted on said vehicle for generating a light beam;

(b) an ignition switch and means for simultaneously operating said light transmission means when said ignition switch is turned to start said vehicle;

(c) a first light receiving means mounted in said enclosure for receiving said generated light beam when said vehicle is positioned in said enclosure so that it can no longer be struck by said closure apparatus, and for generating an output signal to said switch means;

(d) a second light receiving means mounted outside said enclosure in the path of said vehicle entering or leaving said enclosure, said second light receiving means generating a second signal when receiving light from said light transmission means said second light receiving means mounted at least the length of said vehicle from said closure apparatus; and, (e) means for communicating said second signal from said second light receiving means to said switch means;

whereby when said vehicle is at said first light receiving means or passes said second light receiving means said switch means will be operated.

2. Apparatus as claimed in claim 1 wherein said closure apparatus is a garage door.

3. Apparatus as claimed in claim 1 wherein said vehicle includes a switch to turn on said light transmission means.

4. Apparatus as claimed in claim 1 wherein said vehicle includes a timing means for shutting off said light transmission means after a preselected period of time.

5. Apparatus as claimed in claim 4 wherein said ignition switch is connected to turn on said timing means.

* * * * *